United States Patent [19]

Haker et al.

[11] 4,290,113
[45] Sep. 15, 1981

[54] MINICOMPUTER

[75] Inventors: Rolf Haker, Frankenthal; Heinz-Georg Führer, Rauenberg; Rainer van Rijckevorsel, Mannheim; Werner Ruhl, Ludwigshafen; Joachim Thiery, Mannheim, all of Fed. Rep. of Germany

[73] Assignee: Labora Mannheim GmbH für Labortechnik, Mannheim, Fed. Rep. of Germany

[21] Appl. No.: 964,930

[22] Filed: Nov. 30, 1978

[30] Foreign Application Priority Data

Dec. 13, 1977 [DE] Fed. Rep. of Germany ....... 2755407

[51] Int. Cl.³ .............................................. G06F 3/02
[52] U.S. Cl. .................................. 364/900; 235/310; 364/709; 364/710
[58] Field of Search ............... 364/200, 900, 710, 709, 364/705; 235/310

[56] References Cited

U.S. PATENT DOCUMENTS

| | | | |
|---|---|---|---|
| 3,816,731 | 6/1974 | Jennings et al. | 364/705 |
| 3,999,050 | 12/1976 | Pitroda | 364/705 |
| 4,001,569 | 1/1977 | Dickinson | 235/311 |
| 4,081,859 | 3/1978 | Goldsamt | 364/709 |
| 4,092,523 | 5/1978 | Tava et al. | 364/709 |
| 4,117,542 | 9/1978 | Klausner et al. | 364/709 |

*Primary Examiner*—Gareth D. Shaw
*Assistant Examiner*—David Y. Eng
*Attorney, Agent, or Firm*—Herbert L. Lerner

[57] ABSTRACT

Minicomputer including a computing unit, numeral, function and clearing inputs, a fixed-program memory and selectively freely-programmable memories, and a readout or display unit including a selector switch for calculating and converting in two systems of units selectively connectible to the fixed-program memory and the computing unit, the fixed-program memory having means for storing and reading out conversion factors and, selectively inverse values thereof as well as a corresponding dimension, the fixed-program memory having a respective input connected to a factor selection unit and to a call-up unit for the dimension of the respective selected factor and inverse value, and having a respective output connected to the computing unit and to the readout or display unit.

7 Claims, 2 Drawing Figures

MINICOMPUTER

BACKGROUND OF THE INVENTION

The invention relates to a minicomputer including a computing unit, numeral, function and clearing inputs, a fixed-program storage unit, selectively freely-programmable storage or memory units and a readout or display unit. The term "minicomputer" is understood to include preferably pocket calculators and also desk-top calculators, but not large computers. The minicomputer device or set serves for determining medical-diagnostic data and for computing or calculating in at least the four basic mathematical operations.

Pocket calculators with fixed-program storage or memory as well as such with freely programmable storage or memory are generally known. As for the latter, programming is also conceivable in a manner that conversion of several types of variables between two systems of units could be accomplished.

The German Federal Law on Units in Metrology of July 2, 1969, made the International System of Units (Système Internationale d'Unités of the General Conference on Weights and Measures) mandatory for official correspondence. The intent of this law is international simplification and greater ease in calculating with the measuring units used (SI units). In this regard, not only does the conversion of basic units to the international system of units and vice versa occur, but rather, in fact, in the field of medicine and the fields of pharmacy and chemistry allied therewith, many interrelated and frequently used types of quantities are to be converted.

Starting from the heretofore known minicomputer mentioned at the introduction hereto, it is an object of the invention to provide an improved minicomputer of this general type for the conversion of commonly used types of quantities, especially in medicine, which is easy to operate and does not require any knowledge of programming whatsoever.

SUMMARY OF THE INVENTION

With the foregoing and other objects in view, there is provided, according to the invention, a selector switch connected to the memory or to the computer for calculating or converting in two systems of units, and the memory is arranged for storing and reading-out the conversion factors and, if desired, the inverse values thereof and the corresponding dimension, and is connected on the input side both to a factor selection unit and to a callup unit for the dimension of the selected factor or inverse value, and on the output side both to the computer and to the readout or display unit of the device or set. "Dimension" is understood, in this regard, to be the name or the symbol of a measurement unit. The factor selection unit has preferably a letter keyboard.

Due to the measures mentioned, an operator can simply convert the values known to him in one character key, for example, GLU (glucose) in mg/100 ml through the factor 0.0555 into the value of the corresponding SI unit (m mol/l). It is possible to indicate the factor or, in another position of the selector switch, the inverse value. Independently of the position of the selector switch, the dimension of the selected factor can be caused to be indicated through the call-up unit. For correlating the combined character selection and the storage or memory locations for the factors or the inverse values thereof as well as the corresponding dimensions, a suitable interconnecting logic is provided, in accordance with another feature of the invention, which can structurally be related to the factor selection unit or to the storage unit. To avoid errors, a redundant letter value can be entered in addition to the three letter (e.g., GLU) ordinarily united in the subject code, of which internally, however, i.e. for the correlation with the memory location, only the three subject code letters are evaluated. It is further understood that the interlinking logic and the fixed-program memory can also be adjusted for use in other languages.

The selector switch for the direction of the conversion between the two systems of units can be connected to the computer, in accordance with a further feature of the invention. In that case, a first computing circuit thereof comprises a multiplier and a divider, in order to make available, in the simplest case, the factor present from the memory by multiplication by the factor 1, or to form the inverse value thereof by division.

A variant of this possible construction, in accordance with an alternate feature of the invention, is to connect the selector switch to the memory, the output to the computer of which is connected directly to a second computing circuit thereof for the arithmetic linkage of any numerical value to the selected factor which is stored in the computer memory. In that case, the memory has, in addition to the memory locations for the dimensions, two groups of memory locations for the factors and the inverse values which are selected through the factor selection unit and the interlinking unit, depending upon the position of the selector switch.

Advantageously, in accordance with a concomitant feature of the invention, a factor selection key is provided, by which, if operated, the factor selected through the letter combination is called into the computer memory, so that the latter is available for any desired number of operations. After the numerical value to be converted is inserted, the result of the conversion can be obtained and also displayed by depressing the factor readout key, depending upon the position of the selector switch.

Other features which are considered as characteristic for the invention are set forth in the appended claims.

Although the invention is illustrated and described herein as embodied in minicomputer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

DESCRIPTION OF THE PREFERRED EMBODIMENT

Figure 1:
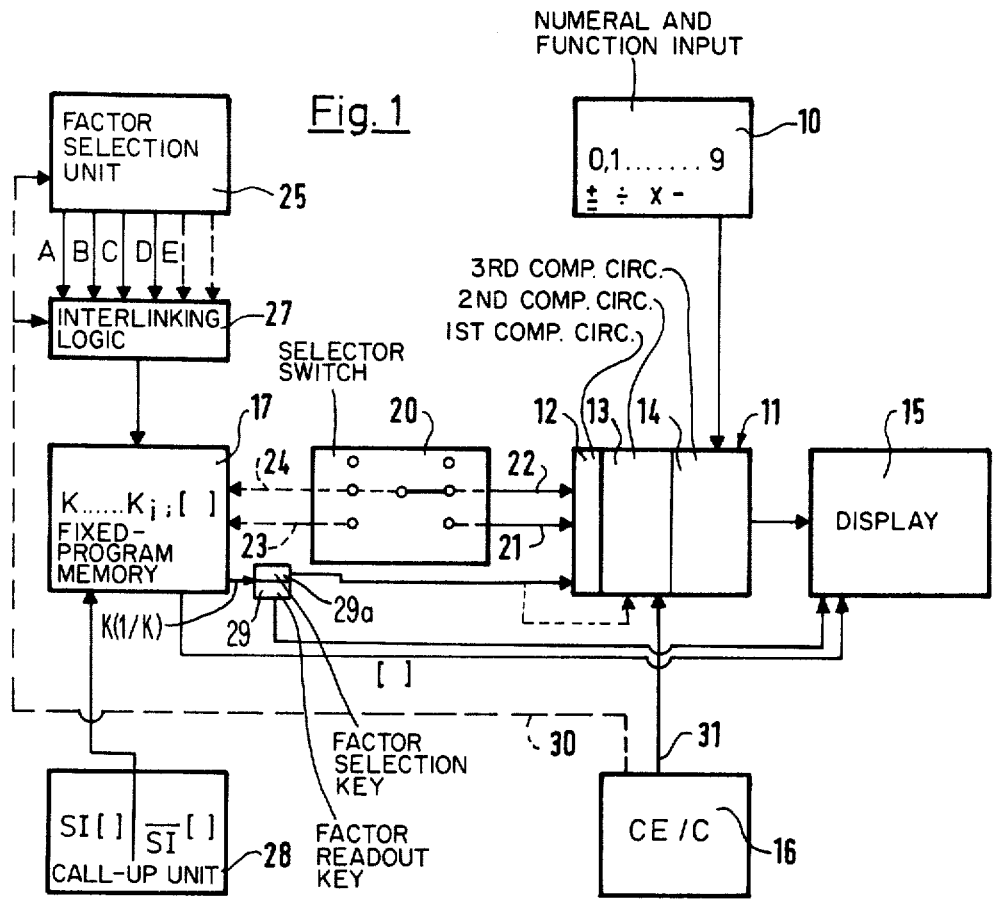
FIG. 1 is a schematic block diagram of the minicomputer according to the invention.

Referring now to the figures of the drawing, it is noted that the minicomputer has at the disposal thereof, first, the usual elements of a pocket calculator, namely a non-illustrated power supply, a numeral and function input 10 which is connected through any number of signal channels to a computer 11 which, in the case at hand, is formed functionally but not necessarily circuit-wise, of three computing circuits 12, 13 and 14, an input-output unit 15 with alphanumeric indication constructed as a light-emitting diode, fluorescent or liquid-crystal display and a converter for converting the information from the binary system into, for example, a conventional 7-segment display with corresponding driver stages for the individual bar segments, a clearing input 16 with one key 16a (CE/C) or two keys CE, C, whereby in the case of two keys, a value that has just been entered can be corrected in a conventional manner by means of the first key, and total clearance can be performed by means of the second key; finally, a fixed-program memory 17 which is set for storing the factors K, K1, . . . Ki and the respective dimensions [. . . ]. In addition, storage of the inverse values of the factors K, . . . Ki and the respective inverse values of dimensions in the memory 17 can be provided. "factor" and "inverse value" are the numerical values of the respective conversion formula (see German Industrial Norms DIN 1301).

The on- and off switch of the minicomputer device or set is constructed as a selector switch 20 with three switch positions and permits an adjustment of the conversion from common units into SI units and vice versa. This selector switch 20 is preferably connected on the output side, on one hand, to a multiplier in the first computing circuit 12 of the computer 11 (connection 21) and, on another hand, to a divider (connection 22). Alternatively thereto, the selector switch can be connected on the output side, also, through connections 23 and 24 to a factor storage portion and an inverse-value storage portion of the memory 17.

The minicomputer further includes a factor selection unit 25 which has a letter keyboard 26 (FIG. 2), which is spatially set off from the numeral keyboard of the numeral input 10. An interlinking logic serves for transmitting signals to the memory 17 and for correlating the letter combinations entered through the factor selection unit 25 with the respective corresponding factors and dimensions in the memory 17. To the memory 17, there is further connected a call-up unit 28 for calling the dimension corresponding to the selected factor or inverse value, and furthermore, on the output side, on one hand, to the computer 11 and, on another hand, to the display unit 15. In the path of the signal to the computer 11, there is a factor selection key 29a, disposed physically on the front panel of the minicomputer device or set, for entering the selected factor or inverse value into a non-illustrated computer memory in the computer 11. In addition, a factor output key 29 is provided, which is operated after the numerical value to be converted has been entered through the conventional numeral keyboard, and thus serves for releasing the conversion and the display by the display unit 15.

The clearing input 16 acts through corresponding connections 30 and 31 on the factor selection unit 25 and the numeral input 10 or the computer 11, which causes "0" to be displayed if the clearing is complete.

Figure 2:
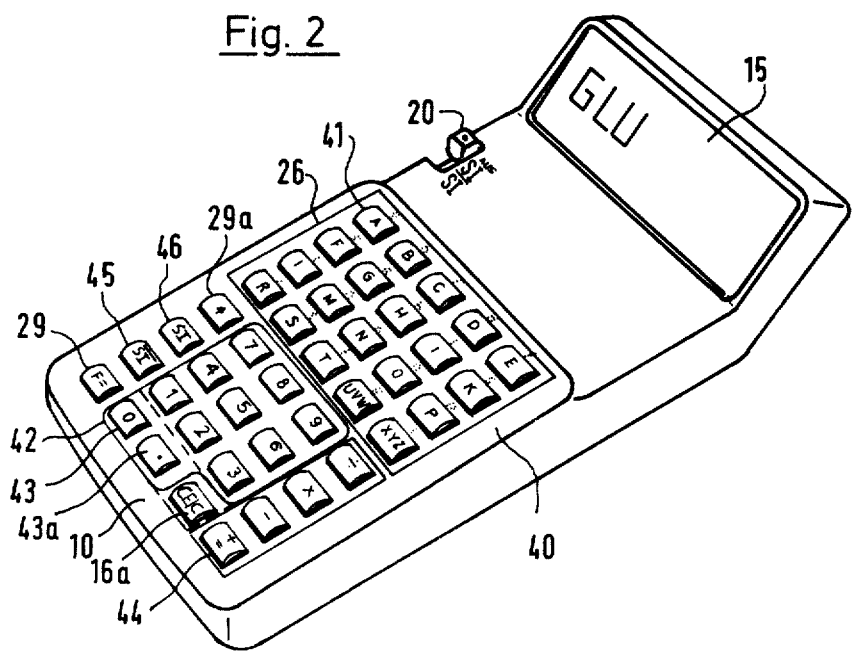
FIG. 2 is a perspective view of a preferred embodiment of the minicomputer.

In FIG. 2, there are shown on the front panel 40 of the minicomputer device or set, besides the hereinafore mentioned selector switch 20, the factor output key 29 and the factor selection key 29a, in the letter keyboard 26, for example, twenty letter keys 41, and in the numeral panel 42, which is physically delineated therefrom, ten numeral keys 43, a decimal point key 43a (the arrangement of the three middle lower keys, namely the numeral key for 0, the clear key 16a and the decimal point key 43a, can be interchanged; the field framed by broken lines), to the righthand side thereof next to the numeral keys 43, for example, four computing function keys 44, and to the left-hand side next to the numeral keys 43, two keys 45 ($\overline{SI}$) and 46 (SI) of the call-up unit 28 for the dimension of the factor or the dimension of the inverse value thereof.

The minicomputer according to the invention operates as follows:

The fixed-program values are selected by operating the letter keys 41; the selected characters can be displayed, incidentally, for checking purposes. Of the selected letters, starting from the hereinaforementioned medical code (example: GLU), a combination of maximally three, for example, is internally evaluated or correlated by the linking logic 27 with a definite factor and a definite dimension. If the factor selection key 29a is operated, the selected factor is put in readiness in a computer memory or register of the first computing circuit 12. If the selector switch 20 is connected to the computer 11, depending upon its position connection is made to a multiplier or a divider by the connections 21 or 22, respectively.

If the selector switch 20 is connected to the memory 17 by the connections 23 or 24, respectively, the memory 17 is connected, if the factor selector key 29a is operated, to the second computing circuit 13 of the computer 11, for arithmetically linking any desired numerical value with the selected factor or inverse value.

After the letter combination is entered, the factor is called into the computer memory or register by operation of the factor selection key 29a, so that the factor is available for further operations in the second computing circuit 13. Simultaneously, the corresponding dimensions can be displayed separately through the call-up unit 28, independently of the position of the selector switch. After the numerical value to be converted is entered, the result of the conversion, depending upon the position of the selector switch 20, can be obtained by depressing the factor readout key 29 (F=). The result is displayed. The calculated-value display unit 15 makes at least eight digits, a sign and floating decimal point available.

Ordinary calculations can be performed by operating the usual arithmetic function keys 44 ($\pm$, $-$, $\times$, $\div$) and the numeral keys 43.

Only by way of example, several conversion examples in SI units are provided hereinafter in tabular form, the foreign-language abbreviations, if different from the German, being given for the examples in the order of first English and then French, after the German abbreviation (key, code):

1. Iron Binding Capacity
    Key EBK
    IBC
    TIB

-continued

| | Old unit | Factor | SI Unit |
|---|---|---|---|
| 2. | μg/100 ml | 0.1791 | μ mol/l |
| | Glucose | | |
| | Key GLU | | |
| | GLC | | |
| | Old Unit | Factor | SI Unit |
| | mg/100 ml | 0.05551 | m mol/l |
| 3. | Urea | | |
| | Key HAR | | |
| | URE | | |
| | US | | |
| | Old Unit | Factor | SI Unit |
| | mg/100 ml | 0.1665 | m mol/l |
| 4. | Potassium | | |
| | Key K | | |
| | Old Unit | Factor | SI Unit |
| | mg/100 ml | 0.2557 | m mol/l |
| 5. | Vitamin C | | |
| | Key VIC | | |
| | AS | | |
| | Old Unit | Factor | SI Unit |
| | mg/100 ml | 56.78 | μ mol/l |

In a further embodiment of the invention, smaller programs can also be preprogrammed and further keys or combinations of the letter keys from the field 26 can be provided for these programs.

For example, a program for the statistical analysis of measured values, especially in medicine, can be provided so that, for example, after a letter combination has been entered, measured values are entered and various statistical values can be obtained by depressing further letter combinations, such as the mean value, standard deviation, variance coefficient, warning and control limits.

Furthermore, either the required addition or subtraction can be performed by a suitable letter combination for the conversion:

$°C. \rightleftarrows K.$ (Kelvin = SI Unit)

or the required calculation:

$°C. \rightleftarrows °F.$ (Fahrenheit)

Finally, through further modification, it is also possible to make the minicomputer freely programmable through letter combinations. For this purpose, the minicomputer is supplemented by freely programmable memories. It is understood, in this regard, that the size of the fixed-program storage content of the memory 17 is always preserved.

There is claimed:

1. Minicomputer for converting values, especially of a medicinal nature, between two systems of units, the minicomputer having manually actuatable numeral, letter, function and clearing keys, a computer unit having computing circuits responsive to numeral, function and clearing keys, respectively, a readout or display unit, respectively responsive to actuation of the keys and the computing circuits, and a fixed program memory wherein calculating routines and conversion factors for the calculation and conversion, respectively, between the two systems of units are stored whereby, upon actuation of a function key, one of the stored conversion factors is addressed thereby and entered from the fixed-program memory into a register of the computer unit, the improvement comprising means in the fixed-program memory for storing not only the conversion factors but also dimensions pertaining thereto in the form of letters, an interlinking logic operative upon actuation of a plurality of letter keys for selectively addressing the respective memory locations for the medical conversion factors and the dimensions pertaining thereto, and a call-up unit operative upon actuation of one of the function keys for display of the dimensions to cause the memory to issue the addressed dimension to the display unit.

2. Minicomputer according to claim 1 including selector switch means for selecting the direction of the conversion between the two systems of units.

3. Minicomputer according to claim 2 wherein said selector switch means is a three-position-switch for also turning-on and shutting-off the minicomputer.

4. Minicomputer according to claim 2 wherein the computer unit comprises a computing circuit with a multiplier, a divider and a register and said selector switch means are connected to the computer unit.

5. Minicomputer according to claim 2 wherein the computer unit comprises a computing circuit with a multiplier and a register and said selector switch means are connected to the fixed-program memory.

6. Minicomputer according to claim 1 including a readout key actuatable for performing the computing operations and for activating the display and readout units, respectively.

7. Minicomputer according to claim 1 wherein the fixed-program memory has a first part thereof for containing the conversion factors, said first part being connected to the computer unit, and the fixed-program memory has a second part thereof for containing the dimensions, said second part being connected directly to the readout or display unit.

* * * * *